United States Patent
Lu (10) Patent No.: US 7,822,065 B2
(45) Date of Patent: Oct. 26, 2010

(54) OPEN WIRELESS ARCHITECTURE (OWA) MEDIUM ACCESS CONTROL (MAC) PROCESSING ARCHITECTURE FOR FUTURE MOBILE TERMINAL

(76) Inventor: Wei Lu, 1218 Bubb Rd., Cupertino, CA (US) 95014

( * ) Notice: Subject to any disclaimer, the term of this patent is extended or adjusted under 35 U.S.C. 154(b) by 899 days.

(21) Appl. No.: 11/620,694

(22) Filed: Jan. 7, 2007

(65) Prior Publication Data

US 2007/0105589 A1 May 10, 2007

(51) Int. Cl.
*H04J 3/16* (2006.01)
(52) U.S. Cl. .................. 370/469; 370/328; 370/332; 455/84; 455/550.1; 455/418; 455/452.1
(58) Field of Classification Search ............... 370/337, 370/321, 406, 336, 345, 347; 455/445, 450–455, 455/428, 465, 84, 550.1, 418
See application file for complete search history.

(56) References Cited

U.S. PATENT DOCUMENTS

| 7,522,888 | B2 * | 4/2009 | Lu | ............... | 455/84 |
| 2005/0159123 | A1 * | 7/2005 | Lu | ............... | 455/183.2 |
| 2005/0250468 | A1 * | 11/2005 | Lu et al. | ............... | 455/403 |
| 2006/0013182 | A1 * | 1/2006 | Balasubramanian et al. | | 370/343 |
| 2007/0081455 | A1 * | 4/2007 | Kashima et al. | ............... | 370/229 |

* cited by examiner

*Primary Examiner*—Ricky Ngo
*Assistant Examiner*—Rasheed Gidado (57) ABSTRACT

A software architecture for future open wireless architecture (OWA) mobile terminal providing an open and secured software platform supporting various wireless air interfaces with multi-dimensional mobility handovers and maximized spectrum efficiency for the truly service-oriented fixed, mobile and wireless communications convergence.

16 Claims, 4 Drawing Sheets

OWA Medium Access Control (MAC) Protocol Architecture

FIG.1 Framework of OWA Mobile Terminal Software Architecture

FIG.2 OWA Medium Access Control (MAC) Protocol Architecture

FIG.3 OWA IP Client Framework

FIG.4 Architecture Example of OWA Seamless Connectivity

OPEN WIRELESS ARCHITECTURE (OWA) MEDIUM ACCESS CONTROL (MAC) PROCESSING ARCHITECTURE FOR FUTURE MOBILE TERMINAL

BACKGROUND OF THE INVENTION

1. Field of the Invention

This invention is directed to a software architecture for future open wireless architecture (OWA) mobile terminal which provides an open and secured software platform to deliver the truly service-oriented architecture rather than the wireless standard-specific architecture across various air interfaces with multi-dimensional mobility handovers for the complete fixed, mobile and wireless communications convergence. The terminal system includes capabilities for maximizing the spectrum utilization efficiency and optimizing the system and transmission resource managements across the multi-layered service offerings by the OWA mobile device.

2. Description of the Related Art

In the future wireless service provision will be characterized by global mobile access (terminal and personal mobility), high quality of services (full coverage, intelligible, no drop and no/lower call blocking and latency), and easy and simple access to multimedia services for voice, data, message, video, world-wide web, GPS, etc. via ONE user SINGLE terminal.

This vision from the user perspective can be implemented by integration of these different evolving and emerging wireless access technologies in a common flexible and expandable platform to provide a multiplicity of possibilities for current and future services and applications to users in a single terminal. Systems of fourth generation mobile communications will mainly be characterized by a horizontal communication model, where different access technologies as cellular, cordless, wireless local area network (WLAN) type systems, short range wireless connectivity, broadband wireless access system and wired systems will be combined on a common platform to complement each other in an optimum way for different service requirements and radio environments which is technically called "Converged Broadband Wireless and Mobility Platform, or Open Wireless Architecture (OWA) in a more technical sense".

OWA defines the open interfaces in wireless networks and systems, including base-band signal processing parts, RF (radio frequency) parts, networking parts, and OS (operating system) and applications/services parts, so that the system can support different industrial standards and integrate the various wireless networks into an open broadband mobility platform. For comparison, Software Defined Radio (SDR) is only a radio in which the preset operating parameters including inter alia frequency range, modulation type, and/or output power limitations can be re-set or altered by software. Therefore, SDR is just one of the implemental modules of the future OWA system.

The wireless industry is rapidly transitioning from proprietary architecture to more flexible, cost effective open wireless architecture (OWA) systems. This transition is creating interesting challenges for developers, manufacturers, integrators, operators and end-users as they wrestle with complexities of open wireless systems.

Any single-architecture wireless system, including single 3G (third generation mobile), UMTS (universal mobile telecom service), WiMax (one of the IEEE802.16 standards), etc., is a transitional solution only, and will be replaced by open wireless architecture (OWA) system very soon where various different wireless standards can be integrated and converged on this open platform.

Fourth Generation (4G) mobile communication will basically focus on the Open Wireless Architecture (OWA), and Cost-effective and Spectrum-efficient High-speed wireless mobile transmission. The 3G system suffers tremendously worldwide because it did not fundamentally improve the wireless architecture, and making the architecture open is the final solution in the wireless industry.

OWA will eventually become the global industry leading solution to integrate various wireless air-interfaces into one wireless open terminal where the same end equipment can flexibly work in the wireless access domain as well as in the mobile cellular networks. As mobile terminal (rather than wireline phone) will become the most important communicator in future, this single equipment with single number and multiple air-interfaces (powered by OWA) will definitely dominate the wireless communication industries.

The software architecture for the OWA system is one of the most important parts in the OWA system solutions. The key considerations of this special OWA software architecture include:

1. Optimized Spectrum Utilization—because the OWA system operates in various air interfaces (wireless standards), and supports future open spectrum management strategy, many design issues should be focused on this maximized spectrum efficiency.

2. Multi-dimensional Mobility Management—because the OWA system will be operating in various air interfaces across multi-layered service platforms, the mobility handovers are multi-dimensional amongst difference cells and different active air interfaces.

3. Multi-layered Security management—because the future OWA system will be targeting for multimedia mobile services including data, video and enhanced messaging services which can be easily under virus-like threats. Meanwhile, wireless spectrum is a very expensive and very limited natural resource, any unwanted service contents must be removed or filtered before transmitting into the wireless medium. In addition, the general wireless channel is an unsecured transmission medium which can be easily detected and attacked. Therefore, enhanced security measures are required for this future OWA system, especially for the OWA mobile terminal system.

4. Optimized Resource Management—The OWA system is a future-proven platform and therefore it must focus on the best resource management strategies including spectrum management, power management, processing management, bandwidth management and channel management to maximize the transmission and system performances for the OWA mobile terminal system.

5. Future Service Oriented Platform—the future mobile communications will be definitely based on the service-oriented platform rather than the wireless standards-specific platform. OWA mobile terminal is optimized for the truly open service architecture platform for the fixed, mobile and wireless communications convergence.

6. Open System Modules—The OWA system modules (both hardware and software) are completely open modules which are extensible, upgradeable, re-configurable and removable. Defined by the open interface parameters, the OWA system is similar to the open computer architecture (OCA) utilized in the commercial Computer products. This is very important because the future mobile terminal device will be first, a Computer, then an open wireless architecture radio system.

Wireless communications are much different from the wireline communications. The OWA solution improves tremendously the conventional wireless systems and converges with the next generation wireline communication technologies to deliver the future-proven integrated and open mobile communication systems supporting the truly service-oriented communication platforms.

More specifically, as will be described within the context of the present invention and has yet been un-addressed in the art, such improved technologies with the above important considerations are capable of constructing the open multimedia transport platform across the whole OWA Service-Oriented Mobility Infrastructure (SOMI) comprising the aforementioned OWA mobile terminal, OWA Access Network and OWA IP Backbone network, wherein the aforementioned OWA Access Network and OWA IP backbone network can be the existing or future commercial networks.

Furthermore, such an OWA mobile terminal system as provided by the present invention could automatically optimize the system resources such as, but not limited to, power consumption and system configuration, and transmission resources such as, but not limited to, spectrum utilization, channel allocation and mobility handovers.

Taking consideration of the above many innovative approaches in the present invention, it is impossible for one ordinary skill in the art can have the ability to modify any possible prior arts in the field to come out this disclosed invention.

SUMMARY OF THE INVENTION

This invention is directed to a software architecture for future open wireless architecture (OWA) mobile terminal which provides an open, extensible and upgradeable software platform supporting various common air interfaces with multi-dimensional mobility handovers for the truly service-oriented fixed, mobile and wireless communications convergence.

The software architecture for future OWA mobile terminal of the present invention incorporates a multi-layered open architecture platform comprising:

OWA Application Layer, containing the important application software modules for the OWA mobile terminal of the present invention OWA IP Client Framework, containing the open functional modules of the middle layers' implementation for the OWA mobile terminal of the present invention OWA Protocol Stacks, containing the important OWA Medium Access Control (MAC) Layer and the Common Air Interfaces layer for the OWA mobile terminal of the present invention OWA Transmission Convergence layer, facilitating adaptive modulation, coding and other physical layer convergence processing for the OWA mobile terminal of the present invention OWA Device Drivers, containing the popular device drivers' modules for the OWA mobile terminal of the present invention OWA Mobile OS (operating system) Platform, supporting the multi-layered application and communication services based on the open OS platform for the OWA mobile terminal of the present invention OWA API (application programming interfaces), enabling underlying protocol stack interfaces as well as device interfaces for the OWA mobile terminal of the present invention OWA User Interfaces, supporting graphical user interface and short-range wireless user interface, etc for the OWA mobile terminal of the present invention OWA Physical Layers, supporting various common air interfaces based on the OWA converged platform for the OWA mobile terminal of the present invention The software architecture for future OWA mobile terminal of the present invention incorporates the OWA IP Client Framework, as set forth above, optimizing the future OWA mobile terminal of the present invention, for the multimedia allocations such as, but not limited to, video streaming, data retrieving and VoIP (voice over IP) through All-IP end-to-end real-time connection.

The software architecture for future OWA mobile terminal of the present invention incorporates the OWA MAC layer, as set forth above, facilitating the aforementioned multi-dimensional mobility handovers, including, but not limited to, horizontal handover between the boundaries of different cells and vertical handover across multiple active air interfaces as well as the multi-layer resource management targeting, but not limited to, bandwidth, spectrum, address, power and channel access.

The software architecture for future OWA mobile terminal of the present invention fully supports fixed, mobile and wireless convergence, wherein the OWA mobile terminal of the present invention, with the aforementioned open software modules, can be utilized as, but not limited to, either a portable computer, a wireline communication terminal or an open wireless mobile terminal, operative in any wireless standards including existing and future air interfaces.

The software architecture for future OWA mobile terminal of the present invention incorporates a Mobility Optimization module in the OWA MAC Layer, as set forth above, optimizing the mobility management strategy for the aforementioned multi-dimensional handovers and supporting seamless mobility solution across different air interfaces.

More specifically, the software architecture for future OWA mobile terminal of the present invention comprises the utilization of Mobility Optimization module, as set forth above, taking the maximum spectrum utilization efficiency as first consideration that, whenever the user slows down its mobility speed and there are multiple active air interfaces available in the user's service geographic area, the OWA mobile terminal of the present invention is capable to operate in the best efficient available wireless standard in the order of, but not limited to, wireless local area network (WLAN), wireless community network, broadband wireless access system (BWA) and mobile cellular network.

The software architecture for future OWA mobile terminal of the present invention incorporates a Bandwidth Manager module in the OWA MAC Layer, as set forth above, calculating and scheduling the communication bandwidth based on available active air interfaces and radio transmission capabilities in certain service geographic area, and maximizing both the system and transmission resources in support of dynamic bandwidth allocation and bandwidth-on-demand (BoD) features.

The software architecture for future OWA mobile terminal of the present invention incorporates a Spectrum Manager module in the OWA MAC Layer, as set forth above, facilitating, but not limited to, the dynamic spectrum sharing, spectrum recycling and spectrum re-use strategies, to maximize the wireless spectrum utilization efficiency and support open spectrum architecture for the future OWA mobile terminal of the present invention.

The software architecture for future OWA mobile terminal of the present invention incorporates a Resource Allocation module in the OWA MAC Layer, as set forth above, scheduling the system resource of the OWA mobile terminal of the present invention, including, but not limited to, wireless transmission resources of various air interfaces, processing resources (such as, but not limited to, baseband processing, radio frequency processing, networking processing and service/application processing), terminal power resources and spectrum resources.

The software architecture for future OWA mobile terminal of the present invention incorporates a Channel Access and Scheduler module in the OWA MAC Layer, as set forth above, detailing the wireless transmission resource schedule of various air interfaces including, but not limited to, frequency channel access, time slot/channel access, code channel access, packet channel access and other future defined channel access.

The software architecture for future OWA mobile terminal of the present invention incorporates a Security module in the OWA MAC Layer, as set forth above, providing enhanced security layer to the aforementioned OWA resource management modules and cooperating with the higher layers to support the enhanced security in applications, services and IP transports, but not limited to, and triggering the pre-filtering process of all unnecessary data traffics through the home/office based Virtual Mobile Server (VMS) before forwarding to the OWA mobile terminal of the present invention, to save wireless spectrum in case of virus-like threats to the aforementioned OWA mobile terminal on data services.

More specifically, the software architecture for future OWA mobile terminal of the present invention comprises the utilization of Security module, as set forth above, capable of working with other software modules of the present invention, to combat the virus-like threats to the OWA mobile terminal of the present invention, comprising the capability that, whenever the aforementioned OWA mobile terminal is under virus-like threats for the data services, but not limited to, the OWA mobile terminal of the present invention can request the corresponding, but not limited to, the Mobile Switching Center (MSC) or IP Gateway, to reroute all the incoming data services to the corresponding home/office based Virtual Mobile Server (VMS) with fixed IP address, as set forth above, before or without forwarding to the OWA mobile terminal of the present invention, to save wireless spectrum and optimize the terminal resource management, as set forth above, wherein the aforementioned VMS is capable of protecting the service contents from, but not limited to, viruses, spyware, worms, phishing scams, spam, identity theft and other inappropriate mobile contents.

The software architecture for future OWA mobile terminal of the present invention incorporates an OSA (open service architecture) Manager module in the OWA MAC Layer, as set forth above, facilitating the open service architecture management platform to support the truly service-oriented mobility infrastructure for the future OWA information core platform.

More specifically, the software architecture for future OWA mobile terminal of the present invention comprises the utilization of OSA Manager, as set forth above, enabling open service offerings across the OWA system platform and supports the open mobile OS platform, as set forth above, to deliver the truly service-oriented mobility architecture rather than the wireless standard-specific architecture.

The software architecture for future OWA mobile terminal of the present invention incorporates a Packet Flow Scheduler module in the OWA MAC Layer, as set forth above, enabling the best efficient packet flow (including, but not limited to, the IP flow) across the various radio transmission technologies (air interfaces), as set forth above, and the aforementioned multi-dimensional mobility handovers of the OWA mobile terminal of the present invention, and maximizing the spectrum utilization efficiency in the wireless end-to-end IP connectivity infrastructure.

The software architecture for future OWA mobile terminal of the present invention incorporates a Node Discovery and Selection module in the OWA MAC Layer, as set forth above, selecting the network access node, routing node or cell discovery, but not limited to, and supporting the multi-dimensional handovers, as set forth above, wherein, the aforementioned node discovery and selection can be based on different selection mechanisms including, but not limited to, signal strength detection, space-time detection, spectrum based selection, QoS (quality of service) oriented selection and other required selection criteria for the future fixed-mobile convergence.

The software architecture for future OWA mobile terminal of the present invention incorporates a Spectrum Module in the OWA IP Client Framework, as set forth above, displaying and updating the digital spectrum map in the service geographic area for the future open spectrum architecture platform of the OWA mobile terminal of the present invention, and testing the spectrum sharing model by calculating the updated spectrum parameters and data.

Further specially, the software architecture for future OWA mobile terminal of the present invention comprising the utilization of the aforementioned Spectrum Manager module in the aforementioned OWA MAC Layer and the aforementioned Spectrum Module in the aforementioned OWA IP Client Frame, as set forth above, jointly delivering the optimal spectrum utilization strategy for the future open spectrum management of the OWA mobile terminal of the present invention.

The software architecture for future OWA mobile terminal of the present invention incorporates an Anti-Virus and Protection (AVP) Agent in the OWA IP Client Framework, as set forth above, defending the OWA mobile terminal of the present invention against, but not limited to, viruses, spyware, worms, phishing scams, spam, identity theft, spectrum misuse and other inappropriate mobile content, and protecting the OWA mobile terminal of the present invention from unauthorized resource consumption by working together with the aforementioned Security modules.

Furthermore, the software architecture for future OWA mobile terminal of the present invention incorporates OWA Security Module in the OWA IP Client Framework, as set forth above, providing enhanced security layer to the service contents across the various air interfaces, as set forth above, constructing the security firewall for the sensitive IP packets across the multiple layers, and executing the OWA security check for the important open software modules defined by the OWA Secured SDM (software defined module) system.

The software architecture for future OWA mobile terminal of the present invention incorporates several new protocol stacks in the OWA IP Client Framework, as set forth above, comprising:

Open Service Architecture Protocol (OSAP), supporting service oriented mobility infrastructure of the future fixed, mobile and wireless convergence Mobile OS Adaptation Protocol (MOSA), supporting the open OS architecture with adaptation for existing and future mobile OS platforms OWA Module Control Protocol (OMCP), supporting open software defined module (SDM) definitions and controls, as set forth above, including, but not limited to, extensibility, upgradeability, re-configurability and removability.

Dynamic Spectrum Management Protocol (DSMP), supporting the spectrum sharing, spectrum recycling and spectrum re-use capabilities, but not limited to, of the future OWA mobile communications of the present invention Mobility Optimization Protocol (MOP), optimizing the aforementioned multi-dimensional mobility handovers and the seamless mobility solutions across the various air interfaces, as set forth above.

The software architecture for future OWA mobile terminal of the present invention incorporates an OWA Open Interfaces Manager module in the OWA IP Client Framework, as set forth above, defining the common interfaces between the OWA IP Engine comprising the IP-friend software modules for the service-oriented mobility architecture platform and the OWA IP Library comprising the IP-related protocols for the service-oriented packet processing, and further managing the operation and maintenance of the system modules (both hardware and software) connected to the OWA open interfaces of the present invention.

The software architecture for future OWA mobile terminal of the present invention incorporates an OWA Open Mobile Operating System (OS) module in the OWA IP Client Framework, as set forth above, providing the OWA open mobile OS platform, as set forth above, based on the aforementioned OWA Open Interfaces Manager, and enabling the flexible adaptation to existing mobile OS platforms including, but not limited to, Windows platform by Microsoft, Symbian platform, Linux platform, Nucleus platform.

The software architecture for future OWA mobile terminal of the present invention comprises the utilization of the OWA Open Interfaces Manager and the OWA Open Mobile OS modules, as set forth above, to re-configure the OWA mobile terminal of the present invention to operate as a regular portable computer whenever the common air interfaces functions of the terminal device are disabled.

The software architecture for future OWA mobile terminal of the present invention comprises the utilization of the aforementioned OWA IP Engine in the OWA IP Client Framework, as set forth above, being a common and open multimedia processing platform across the multi-layered service offerings of the future fixed, mobile and wireless convergence.

The software architecture for future OWA mobile terminal of the present invention comprises the utilization of such OWA mobile terminal, the OWA Access Networks and the OWA IP Backbone networks to construct the OWA Service-Oriented Mobility Infrastructure (SOMI) providing the truly open service offerings across the various radio transmission technologies (air interfaces) with the multi-layered mobility management platform, wherein the aforementioned OWA Access Network is an existing or future commercial wireless or mobile network such as, but not limited to, CDMA network, GSM network, W-CDMA network, Broadband wireless access network or Wireless LAN, and the aforementioned OWA IP Backbone network is an existing or future commercial IP backbone network such as, but not limited to, the commercial Internet.

The software architecture for future OWA mobile terminal of the present invention comprising the utilization of the aforementioned multi-layered mobility management in the OWA SOMI, as set forth above, supporting the aforementioned multi-dimensional mobility handovers for the OWA mobile terminal of the present invention.

Furthermore, the software architecture for future OWA mobile terminal of the present invention comprises the utilization of the aforementioned multi-layered mobility management in the OWA SOMI, as set forth above, maximizing the spectrum utilization efficiency and optimizing the dynamic spectrum management including, but not limited to, spectrum sharing, spectrum recycling and spectrum re-use by prioritizing the air interface list whenever the multiple active air interfaces in the same service geographic area are available to the users, in the order of, but not limited to, wireless local area network (WLAN), local wireless community network, broadband wireless access system (BWA) and mobile cellular network.

The software architecture for future OWA mobile terminal of the present invention comprises the utilization of this OWA mobile terminal working closely with the OWA SOMI, as set forth above, constructing an enhanced security and protection firewall to defend the OWA mobile terminal of the present invention against, but not limited to, any viruses, spyware, worms, phishing scams, spam and other inappropriate mobile contents in any services, and ban all the unwanted contents of the aforementioned virus-like threats before transmitting to the wireless medium to save the wireless spectrum and optimize the transmission and system performances of the OWA mobile terminal of the present invention.

In conclusion, the software architecture for future OWA mobile terminal of the present invention comprises a set of innovative solutions providing a new way to build the open software platform via common modular components to enable the wireless industry, customers and users to accelerate the evolution of innovative and open platform designs for the future fixed, mobile and wireless communications convergence.

These and other features and advantages of the present invention will become more clear when the drawings as well as the detailed description are taken into consideration.

BRIEF DESCRIPTION OF THE DRAWINGS

For the full understanding of the nature of the present invention, reference should be made to the following detailed description with the accompanying drawings in which.

Like reference numerals refer to like parts throughout the several views of the drawings.

DESCRIPTION OF THE PREFERRED EMBODIMENT

The present invention relates to the software architecture for the future next generation wireless mobile communications terminal device based on the open wireless architecture (OWA) technology platform.

Figure 1:
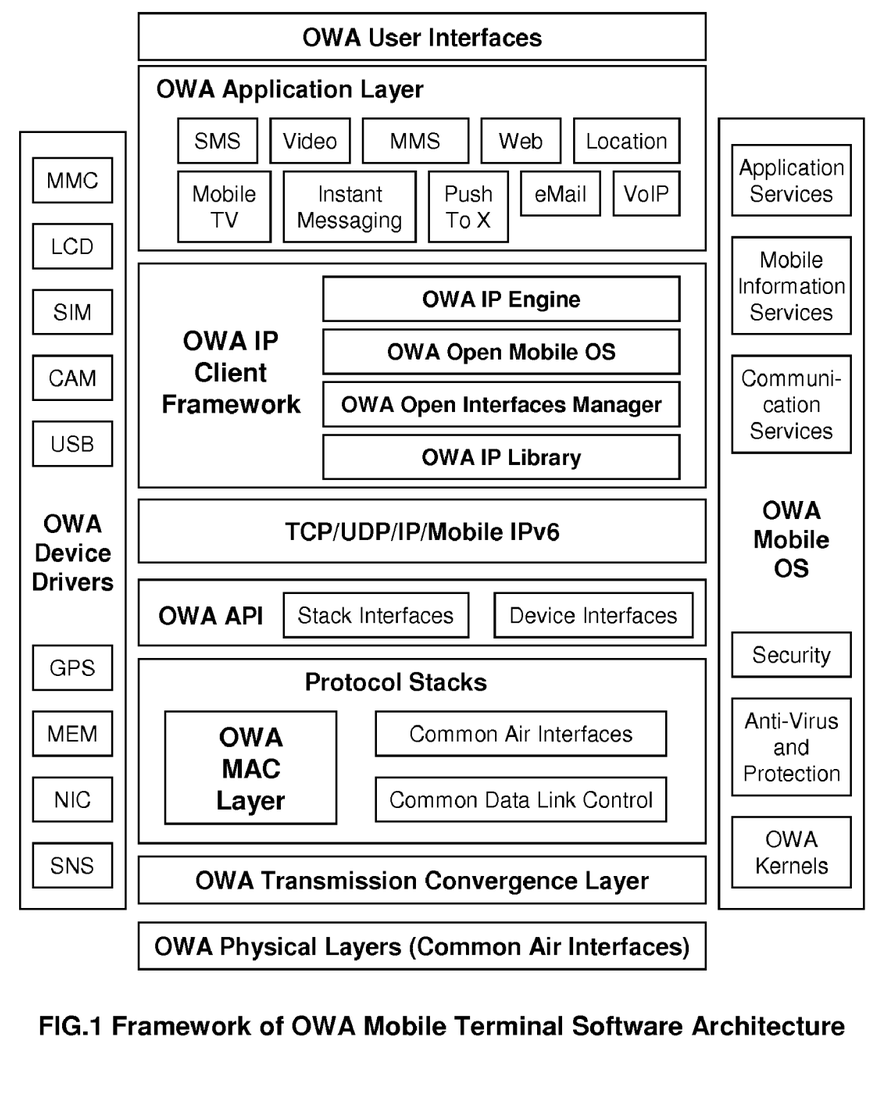
FIG. 1 is the general illustration of the OWA (open wireless architecture) mobile terminal software architecture, supporting service oriented open mobile applications and multiple wireless standards in an integrated and converged common wireless platform.

FIG. 1 is the general framework of OWA mobile terminal software architecture of the present invention. The key software components are:

OWA Application Layer—It contains the important application software modules for the future mobile terminal device of the present invention. These modules are:
- SMS (Short Message Service)
- Video service including video telephony and video streaming
- MMS (Multimedia Message Service)
- Web browsing service
- Location service supporting navigation, positioning and mobility tracking, etc.
- Mobile Television (TV) service supporting different standards of mobile TV broadcasting and interactive TV retrieving services
- Instant Messaging service
- Push-To-X services including Push-To-Talk, Push-To-View, Push-To-Video, Push-To-Control and Push-To-Mail, etc.
- E-mail service
- Voice over IP (VoIP) service OWA IP Client Framework—It contains four main functional modules:
- OWA IP Engine providing various services from the application layer
- OWA Open Mobile OS (operating systems) supporting different mobile OS platforms of the industry
- OWA Open Interfaces Manager handling the signaling and the user data for the various services initiated by the user, and configuring automatically subject to different service offerings by the providers.
- OWA IP Library containing the bearers for the OWA IP client engine for the various services.

OWA Protocol Stacks—It contains three software modules:
- OWA Medium Access Control (MAC) Layer handling the resource management and mobility management of the OWA systems
- Common Air Interfaces including existing and future radio transmission technologies (or called wireless standards) such as CDMA (code division multiple access), TDMA (time division multiple access) and OFDM (orthogonal frequency division multiplex)
- Common Data Link Control implementing existing and future data link control layer OWA Transmission Convergence Layer—It facilitates adaptive modulation, coding, equalization and other processing for various radio transmission technologies.

OWA Device Drivers—It contains the popular device drivers' modules, such as:
- MMC (Multi-Media Card)
- LCD (Liquid Crystal Display)
- SIM (Subscriber Identity Module)
- CAM (Camera)
- USB (Universal Serial Bus)
- GPS (Global Positioning System)
- MEM (Memory Card)
- NIC (Network Interface Card)
- SNS (Sensor)

OWA Mobile OS Platform—It supports the following software modules:
- Application Services module corresponding to the aforementioned OWA Application Layer
- Mobile Information Services module such as news, television, finance, weather, sports, location and yellow book, etc.
- Communication Services module such as E-mail, SMS, MMS, Voice, Conference or Instant Messaging, etc.
- Security module including application layer security, network layer security and wireless transmission security, etc.
- Anti-Virus and Protection (AVP) firewall module protecting the OWA mobile terminal from viruses, spyware, worms, phishing scams, spam, identity theft and other inappropriate mobile content
- OWA Kernels containing necessary processing cores of the OWA mobile terminal TCP (Transmission Control Protocol), UDP (User Datagram Protocol), IP (Internet Protocol) and Mobile IPv6 (IP version 6)—It supports All-IP Fixed Mobile Convergence and End-to-End IP Connectivity.

OWA API (Application Programming Interfaces)—It enables underlying protocol stack interfaces as well as device interfaces.

OWA User Interfaces—It supports graphical user interface and short-range wireless user interface, etc.

OWA Physical Layers—It supports various common air interfaces (wireless standards) based on the open wireless architecture (OWA) converged platform.

As I pointed out in Stanford University, June 2004 that, the future mobile terminal will be first, a Computer, then an Open Wireless Architecture (OWA) terminal. The aforementioned OWA Application Layer, the aforementioned OWA Mobile OS and the aforementioned OWA Device Drivers are specially designed for this complete computer-mobile convergence and integration.

The aforementioned OWA IP Client Framework is to optimize the future OWA mobile terminal for the multimedia applications, such as video streaming, data retrieving and VoIP, through All-IP end-to-end real-time connection.

The aforementioned OWA MAC Layer is to facilitate the multi-dimensional mobility handovers, including horizontal handover between the boundaries of different cells and vertical handover across multiple active air interfaces, as well as the multi-layer resource management targeting bandwidth, spectrum, address, power and channel access.

The OWA mobile terminal of the present invention fully supports fixed and mobile convergence. Therefore, this OWA mobile terminal device with the aforementioned software architecture can be utilized as either a portable computer, a wireline communication terminal or an open wireless mobile terminal operative in any wireless standards including existing and future air interfaces.

Each aforementioned software module is an open module which is extensible, upgradeable, reconfigurable and removable. Furthermore, each aforementioned software module is based on OWA definitions by open interface parameters.

Figure 2:
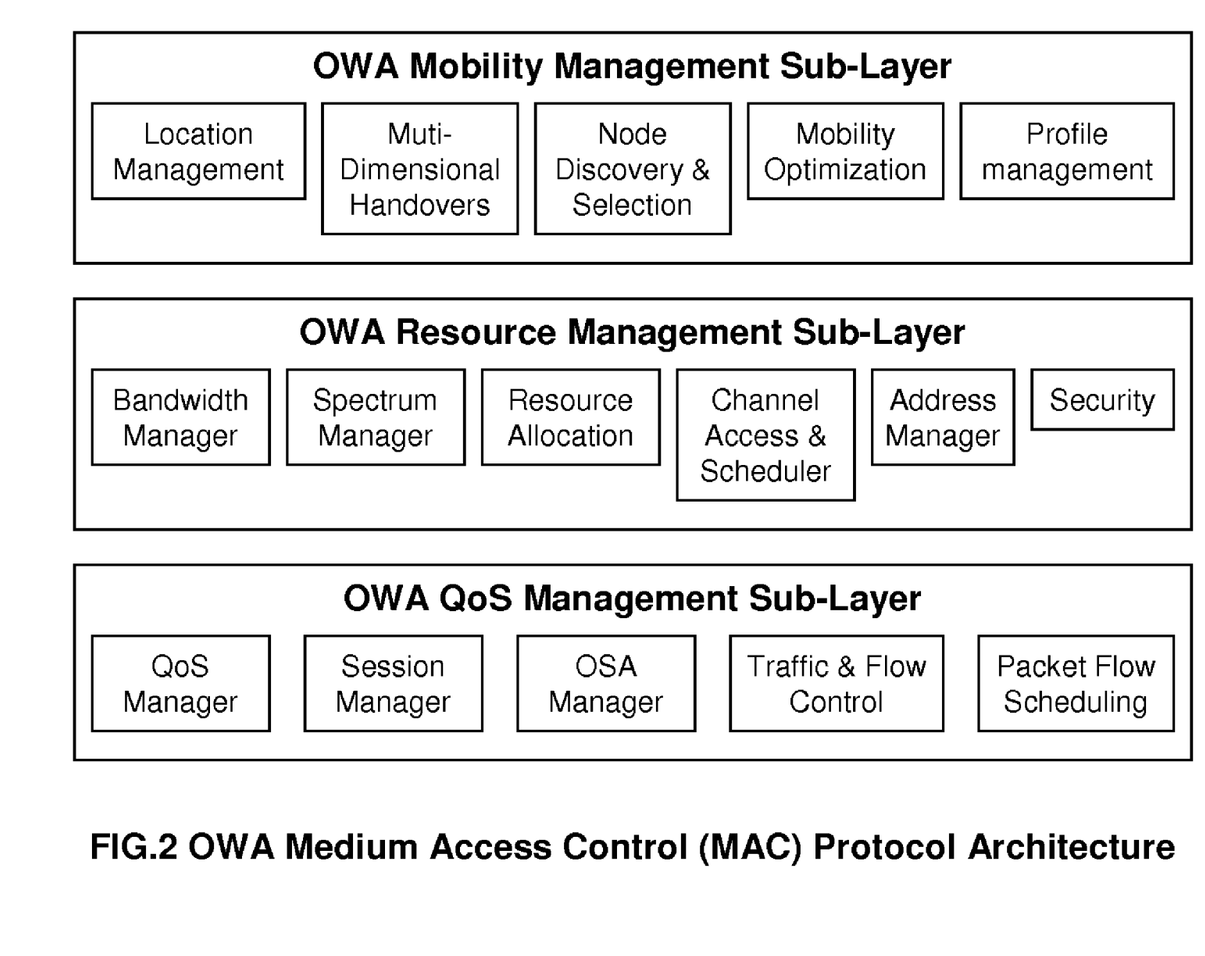
FIG. 2 is the OWA medium access control (MAC) protocol architecture for the OWA mobile terminal, comprising mobility management, resource management and QoS (quality of service) management in one open wireless architecture platform.

FIG. 2 is the OWA Medium Access Control (MAC) Protocol Architecture. The key software components are:

OWA Mobility Management Sub-Layer—It manages the important handovers and mobility controls with the following software modules:

- Location Management, updating the location information and navigation information with the digital map database
- Multi-Dimensional Handovers, performing the complete handover processing of:
  - Horizontal handover: a mobile device enters/exits the boundaries of a cell area;
  - Vertical handover: a mobile device needs to move across multiple active air interfaces, but select one at a time.
- Node Discovery and Selection, selecting the network access node, routing node or cell discovery and supporting the multi-dimensional handovers
- Mobility Optimization, optimizing the mobility management strategy for multi-dimensional handovers and supporting seamless mobility solution across different air interfaces (wireless standards)
- Profile Management, handling the user profile management and the terminal profile management in mobility management process OWA Resource Management Sub-Layer—It manages the multi-layer access controls and resource allocations with the following important modules:

- Bandwidth Manager, calculating and scheduling the communication bandwidth based on available active air interfaces and radio transmission capabilities in certain service geographic area, and maximizing the system resources in support of dynamic bandwidth allocation and bandwidth-on-demand (BoD) features
- Spectrum Manager, facilitating the dynamic spectrum sharing, spectrum recycling and spectrum re-use strategies to maximize the wireless spectrum utilization efficiency and support open spectrum architecture for the future mobile communications
- Resource Allocation, scheduling the system resources of the OWA mobile terminal including wireless transmission resources of various air interfaces, processing resources (baseband processing, radio frequency processing, networking processing and service/application processing), terminal power resources and spectrum resources
- Channel Access and Scheduler, detailing the wireless transmission resource schedule of various air interfaces including frequency channel access, time slot/channel access, code channel access, packet channel access and other future defined channel access
- Address Manager, updating and optimizing the system address corresponding to each individual resource module in OWA resource management sub-layer
- Security module, providing enhanced security layer to the important OWA resource management modules and cooperating with the higher layers to support the enhanced security in applications, services and IP transports, and triggering the pre-filtering process of all unnecessary data traffics through the home/office based Virtual Mobile Server (VMS) before forwarding to the OWA mobile terminal to save wireless spectrum in case of virus-like threats to the mobile terminal on data services OWA QoS Management Sub-Layer—It optimizes the Service-oriented architecture platform for the future OWA mobile terminal with the following key functional modules:

- QoS Manager, handling the user QoS definitions, configuration and management, and coordinating the QoS requirements and management with the service providers of the various wireless standards
- Session Manager, taking care of each session's initialization, activation, deactivation and termination, and supporting multi-layer sessions' maintenance and operations across various air interfaces of the OWA terminal platform
- OSA Manager, facilitating the Open Service Architecture (OSA) management platform to support the truly service-oriented mobility infrastructure for the future OWA information core platform
- Traffic and Flow Controller, optimizing the communication traffic and flow control of the OWA mobile terminal, and achieving the best transmission performance and system performance for the OWA terminal
- Packet Flow Scheduler, enabling the best efficient packet flow (including IP flow) across the various radio transmission technologies (air interfaces) and multi-dimensional mobility handovers of the OWA mobile terminal, and maximizing the spectrum utilization efficiency in the wireless end-to-end IP connectivity infrastructure The aforementioned Node Discovery and Selection can be based on different selection mechanisms including signal strength detection, space-time detection, spectrum saving selection, QoS oriented selection and other required selection criteria for the fixed-mobile convergence.

The aforementioned Mobility Optimization takes the maximum spectrum utilization efficiency in consideration which means, whenever the user slows down its mobility speed and there are multiple active air interfaces available in the user's service geographic area, the system is capable to operate in the best efficient available wireless standard in the order of wireless local area network (WLAN), wireless community network, broadband wireless access system (BWA) and mobile cellular network.

The aforementioned Multi-Dimensional Handovers are coordinated with the aforementioned OWA Resource Management Sub-Layer and the aforementioned OWA QoS Management Sub-Layer.

The aforementioned Resource Allocation is coordinated with the aforementioned Spectrum Manager, the aforementioned Channel & Access Scheduler and its power management sub-module to optimize the system performance and the transmission performance of the OWA mobile terminal.

The aforementioned OSA Manager enables open service offerings across the OWA system platform and supports the open mobile OS platform to deliver the truly service-oriented mobility architecture rather than the wireless standard-specific architecture.

The aforementioned Security module is capable of working with other software modules to combat the virus-like threats to the OWA mobile terminal which includes the capability that, whenever the OWA mobile terminal is under virus-like threats for the data services, the system can request the corresponding Mobile Switching Center (MSC) or IP Gateway to reroute all the incoming data services to the corresponding home/office based Virtual Mobile Server (VMS) with fixed IP address before or without forwarding to the OWA mobile terminal to save wireless spectrum and optimize the terminal resource management. The aforementioned VMS is capable of protecting the service contents from viruses, spyware, worms, phishing scams, spam, identity theft and other inappropriate mobile contents.

Each aforementioned software module is an open module which is extensible, upgradeable, reconfigurable and removable. Furthermore, each aforementioned software module is based on OWA definitions by open interface parameters.

Figure 3:
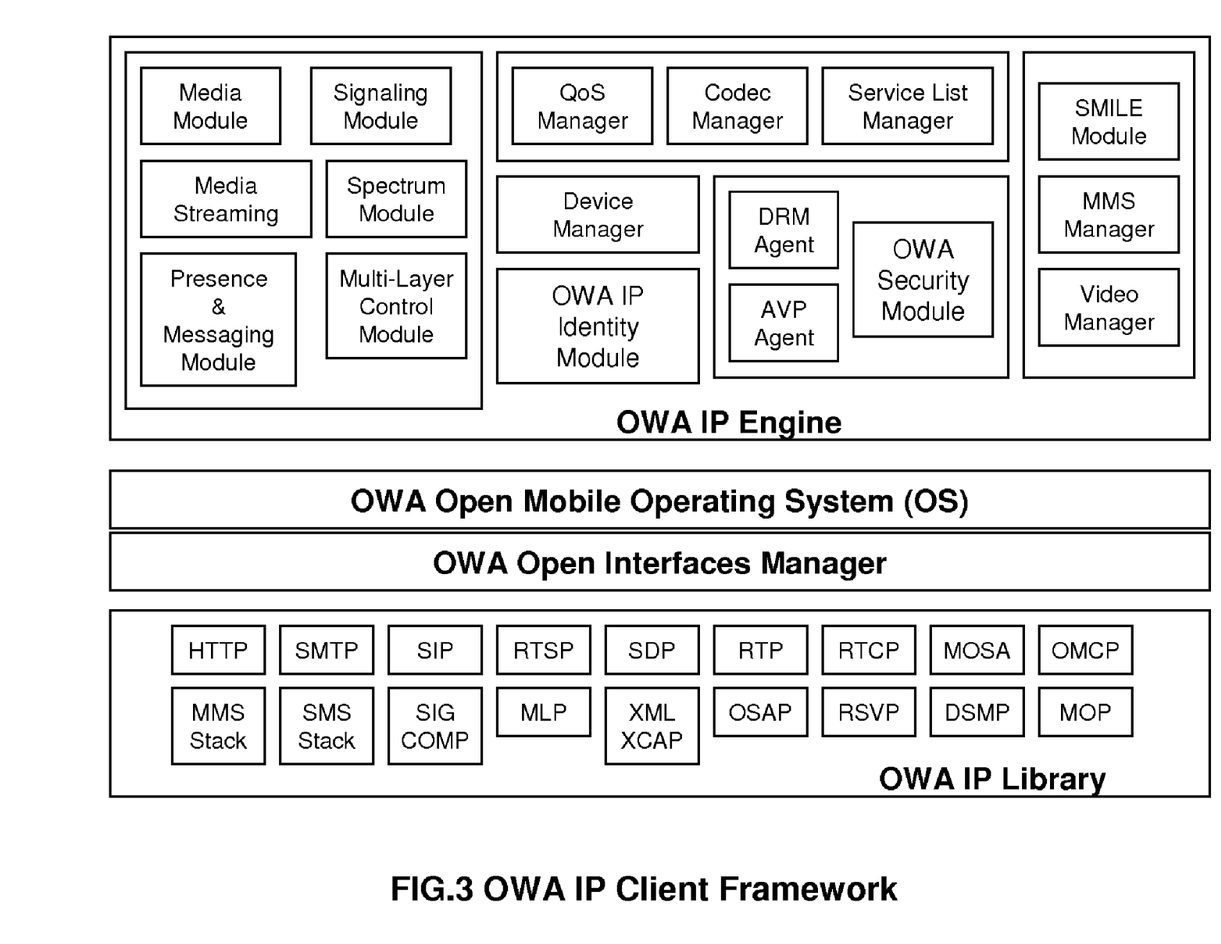
FIG. 3 is the OWA IP client framework for the future mobile terminal, integrating the multimedia IP technologies into the high layer OWA system implementation.

FIG. 3 is the OWA IP Client Framework of the OWA mobile terminal. The main software components are:

OWA IP Engine—It defines the IP-friend software modules for the service-oriented mobility architecture platform of the OWA mobile terminal with the following components:
  Media Module, providing support of media control for various voice, video and data services, enabling interfaces to various codecs for multimedia application and providing support for any specialized communication applications such as voice bridging and video conferencing
  Signaling Module, handling signaling for the specific sessions and services, providing an interface to the QoS Manager, as set forth below, for applying QoS to individual sessions and users
  Media Streaming, controlling the media flow and operation including video streaming, television streaming and multimedia streaming
  Presence and Messaging Module, providing the user the presence information of other selected users who are registered in the service and subscribed in the presence server, and enabling specific messaging services including instant message, short message or multimedia message
  Multi-Layer Control Module, generating the status request and control commands with the devices in the OWA mobile terminal, collecting the status response, and controlling the home/office appliances in some aforementioned Push-To-X operations
  Spectrum Module, displaying and updating the digital spectrum map in the service geographic area for the future open spectrum architecture platform of the OWA mobile terminal, and testing the spectrum sharing model by calculating the updated spectrum parameters and data
  QoS Manager, measuring and monitoring the QoS parameters of a session established for various services, maintaining the reliable transmission medium across various air interfaces, and optimizing the transmission performance based on QoS requirements
  Codec Manager, managing various codecs (encoding and decoding devices) such as speech audio codec, video codec, TV codec and secured data codec
  Service List Manager, providing the user to manage the user's service preferences across the multi-layer's service offerings of the various wireless standards, sharing the user's service information with other users in the same group, and prioritizing the user' service list based on the aforementioned OSA Manager
  Device Manager, handling different devices management including address definitions and driver installation
  OWA IP Identity Module, containing the identity information such as private user identity, public user identity, home network IP address, virtual mobile server IP address and other important system identity information
  DRM (Digital Rights Management) Agent, checking the validation of the service contents and decrypting the protected files if authorized, and protecting all the copyrighted contents across the multi-layer service offerings of the OWA mobile terminal
  AVP (Anti-Virus and Protection) Agent, defending the OWA mobile terminal against Viruses, Spyware, Worms, Phishing scams, Spam, Identity theft, Spectrum misuse and other inappropriate mobile content, triggering to filter all unnecessary contents through the Virtual Mobile Server located in the user's home/office networks before or without forwarding to the OWA mobile terminal, and protecting the terminal system from unauthorized resource consumption
  OWA Security Module, providing enhanced security layer to the service contents across the various air interfaces, constructing the security firewall for the sensitive IP packets across the multiple layers, and executing the OWA security check for the important open software modules defined by the OWA Secured SDM (software defined module)
  SMILE (Synchronized Multimedia Integration Language & Emulation) Module, a mark-up language and the emulation platform for building time-based, streaming multimedia presentations that combine audio, video, images and text
  MMS (Multimedia Messaging Service) Manager, handling the messaging service containing still images, text, voice or audio clips, video clips and presentation information
  Video Manager, especially handling the video services for the future OWA mobile terminal including the video streaming and video conference OWA IP Library—It contains the well-known IP-related protocols for the service-oriented packet processing with the following elements:
  HTTP: Hyper Text Transfer Protocol
  SMTP: Simple Mail Transfer Protocol
  SIP: Session Initiation Protocol
  RTSP: Real-Time Streaming Protocol
  SDP: Service Discovery Protocol
  RTP: Real-time Transport Protocol
  RTCP: Real-Time Control Protocol
  MMS Stack: Multimedia Messaging Service protocol Stack
  SMS Stack: Short Message Service protocol Stack
  SIG COMP: Signaling Compression protocol
  MLP: Mobile Location Protocol
  XML/XCAP: Extensible Markup Language/XML Configuration Access Protocol
  RSVP: ReSource reservation Protocol
  OSAP: Open Service Architecture Protocol, a new protocol defined in the OWA system for supporting truly service oriented mobility infrastructure of the future fixed, mobile and wireless convergence.
  MOSA: Mobile OS Adaptation protocol, a new protocol defined in the OWA system for supporting the open OS architecture with adaptation for existing and future mobile OS platforms.
  OMCP: OWA Module Control Protocol, a new protocol defined in the OWA system for supporting open software defined module (SDM) definitions and controls (extensibility, upgradeability, re-configurability and removability).
  DSMP: Dynamic Spectrum Management Protocol, a new protocol defined in the OWA system for supporting the spectrum sharing, spectrum recycling and spectrum re-use capabilities of the future OWA mobile communications.
  MOP: Mobility Optimization Protocol, a new protocol defined in the OWA system for optimizing the multi-dimensional mobility handovers and the seamless mobility solutions across the various air interfaces.

OWA Open Interfaces Manager—It defines the common interfaces between the aforementioned OWA IP Engine and the aforementioned OWA IP Library, based on the OWA open interface parameters (OIP). It also manages the O&M (operation and maintenance) of the system modules (both hardware and software) connected to the OWA open interfaces.

OWA Open Mobile Operating System (OS)—It provides the open OS platform based on the aforementioned OWA Open Interfaces Manager defined by the OWA system, and enables the flexible adaptation to existing mobile OS platforms.

The aforementioned Spectrum Module is a very important software module to enable the open spectrum management mechanism for the future mobile and wireless communications. It updates the digital spectrum map of the service geographic areas for the various air interfaces, and calculates the best spectrum sharing model with the maximum spectrum utilization efficiency for the future OWA mobile terminal.

The aforementioned OWA IP Engine is a common and open multimedia processing platform across the multi-layer service offerings of the future fixed, mobile and wireless convergence.

The aforementioned OWA Open Interfaces Manager and the aforementioned OWA Open Mobile OS enable the OWA mobile terminal to be a regular portable computer whenever the common air interfaces functions of the terminal are disabled.

Each aforementioned software module is an open module which is extensible, upgradeable, reconfigurable and removable. Furthermore, each aforementioned software module is based on OWA definitions by open interface parameters.

Figure 4:
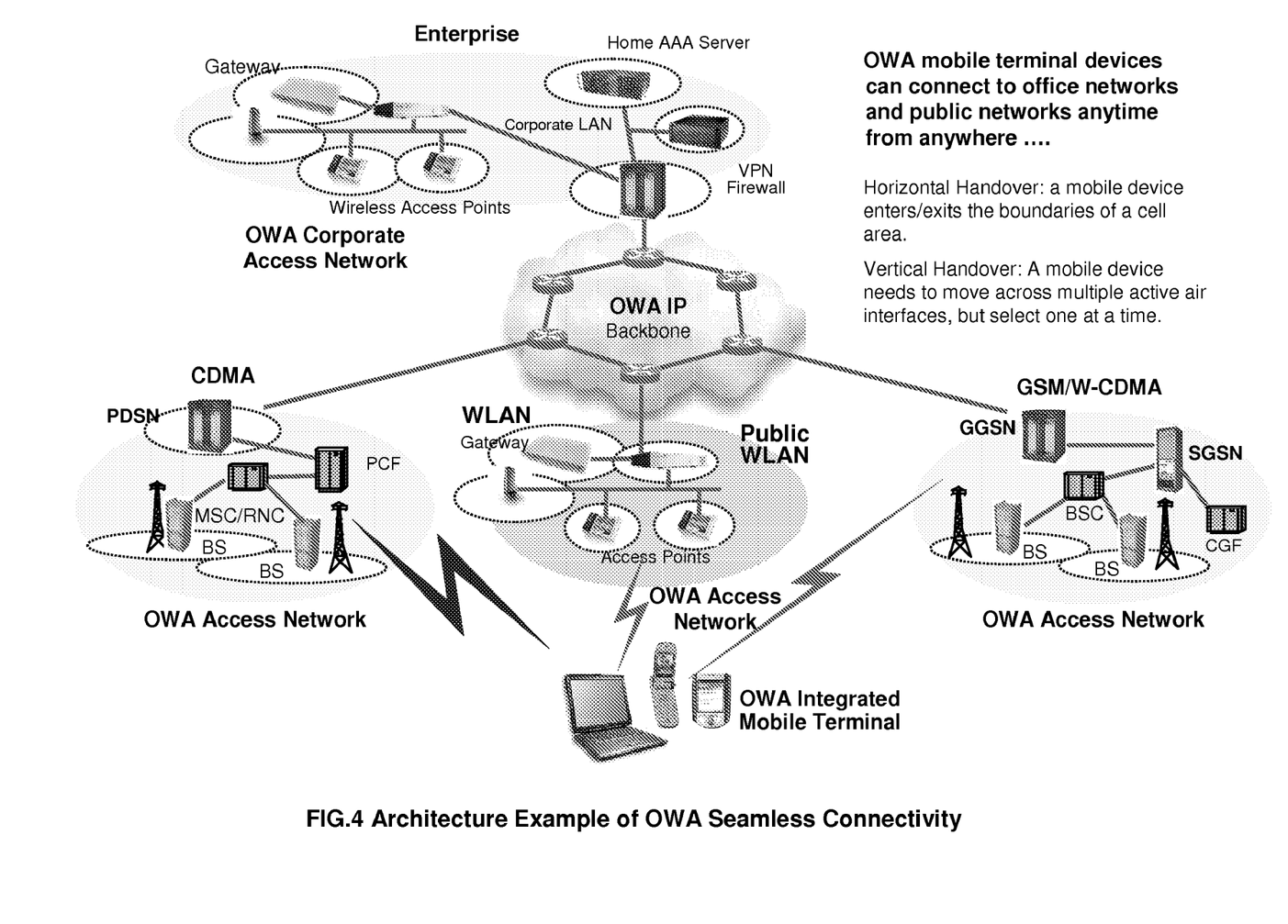
FIG. 4 is an example of OWA seamless connectivity for OWA mobile terminal, describing the converged infrastructure of open wireless architecture and open network architecture.

FIG. 4 is an architecture example of OWA seamless connectivity. The main structure components are:

- The single integrated OWA mobile terminal can connect to any OWA Access Network of various common air interfaces (wireless standards).
- The aforementioned OWA Access Network is an existing or future commercial wireless or mobile communication network, such as CDMA network, GSM network, W-CDMA network or Wireless LAN.
- The aforementioned OWA Access Network connects to the OWA IP Backbone network.
- The aforementioned OWA IP Backbone is an existing or future commercial IP backbone network, such as commercial Internet.
- The OWA Corporate Access Network is a secured OWA Access Network, as set forth above.
- The aforementioned OWA Mobile Terminal, the aforementioned OWA Access Network and the aforementioned OWA IP Backbone construct the OWA Service-Oriented Mobility Infrastructure (SOMI) to provide the truly open service offerings across the various radio transmission technologies (air interfaces) in the Multi-Layer Mobility Management fashion.
- The aforementioned Multi-Layer Mobility Management in the aforementioned OWA SOMI demands the Multi-Dimensional Handovers for the aforementioned OWA Mobile Terminal, which includes:
  Horizontal Handover: a mobile terminal device enters/exits the boundaries of a cell area or a service access area
  Vertical Handover: a mobile terminal device needs to move across multiple active air interfaces (wireless standards), but select one at a time

- The aforementioned Multi-Layer Mobility Management needs to be optimized to maximize the spectrum utilization efficiency and enable the dynamic spectrum management including spectrum sharing, spectrum recycling and spectrum re-use by prioritizing the wireless air interfaces, whenever the multiple active air interfaces in the same service geographic area are available, in the order of wireless local area network (WLAN), local wireless community network, broadband wireless access system (BWA) and mobile cellular network.
- The aforementioned OWA Mobile Terminal works with the aforementioned OWA SOMI to construct an enhanced security and protection firewall to defend the aforementioned OWA Mobile Terminal against any viruses, spyware, worms, phishing scams, spam and other inappropriate mobile content in any services, and ban all the unwanted contents of the above virus-like threats before transmitting to the wireless medium to save the wireless spectrum and optimize the transmission and system performances of the aforementioned OWA Mobile Terminal.

In summary, the software architecture for the OWA mobile terminal of the present invention is a set of robust solutions which provides a way to build open software platform via common modular components. It has been designed to enable the wireless industry and customers to accelerate the evolution of innovative, differentiated and open platform designs for the future fixed, mobile and wireless convergence.

Furthermore, the software architecture for the OWA mobile terminal of the present invention is a group of open software modules which are obvious variants, mutually inclusive and capable of use together as a whole system body for the design of the future mobile communication terminal based on open wireless architecture technology platform.

The software architecture for the OWA mobile terminal of the present invention is not meant to be limited to the aforementioned prototype system platform and architecture, and the subsequent specific description utilization and explanation of certain characteristics previously recited as being characteristics of this prototype system platform are not intended to be limited to such technologies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. An Open Wireless Architecture (OWA) Medium Access Control (MAC) Processing Architecture for future mobile terminal, said terminal comprising:
   a) OWA Mobility Management Sub-Layer system processing the mobility handovers and mobility controls modules comprising location management, multi-dimensional handovers, node discovery and selection, mobility optimization and profile management,
   b) OWA Resource Management Sub-Layer system processing the multi-layered access controls and resource allocations modules comprising bandwidth manager, spectrum manager, resource allocation manager, channel access scheduler, address manager and security manager, and
   c) OWA QoS (quality of service) Management Sub-Layer system processing the service-oriented architecture modules comprising QoS manager, session manager, OSA (open service architecture) manager, traffic and flow controller and packet flow scheduler.

2. The OWA MAC terminal as recited in claim 1 wherein said mobility optimization module optimizes mobility management strategy for said multi-dimensional handovers and supports seamless mobility solution across various air interfaces.

3. The OWA MAC terminal as recited in claim 2 comprising capability for said OWA mobile terminal to operate in the best available wireless air interface of maximized spectrum utilization efficiency, whenever the user slows down its mobility speed for certain period of time and there are multiple active air interfaces available in the user's service geographic area, in the order of wireless local area network, wireless community network, broadband wireless access system and mobile cellular network.

4. The OWA MAC terminal as recited in claim 1 wherein said multi-dimensional handovers module handles both horizontal handover when said OWA mobile terminal enters/exits the boundaries of a cell area, and vertical handover when said OWA mobile terminal needs to move across multiple active air interfaces, but select one at a time.

5. The OWA MAC terminal as recited in claim 1 wherein said spectrum manager facilitates dynamic spectrum sharing, spectrum recycling and spectrum re-use strategies to maximize the wireless spectrum utilization efficiency and support open spectrum architecture for said OWA mobile terminal.

6. The OWA MAC terminal as recited in claim 1 wherein said node discovery and selection module searches the network access node, routing node or cell discovery based on different selection mechanisms including signal strength detection, space-time detection, spectrum based selection and QoS oriented selection, to support said multi-dimensional handovers.

7. The OWA MAC terminal as recited in claim 1 wherein said security module provides enhanced security protection to said OWA resource management sub-layer modules and further supports the enhanced security in OWA application layer, OWA IP (Internet Protocol) client framework and OWA mobile OS (Operating System) platform.

8. The OWA MAC terminal as recited in claim 7 comprising the capability that, whenever said OWA mobile terminal is under virus-like threats for data services, said OWA mobile terminal can request the corresponding mobile switching center (MSC) or IP gateway/router to reroute all the incoming data services to the corresponding home/office based virtual mobile server (VMS) with fixed IP address before or without forwarding to said OWA mobile terminal to save wireless spectrum and optimize said OWA resource management of said OWA mobile terminal.

9. The OWA MAC terminal as recited in claim 1 wherein said OSA manager facilitates the open service architecture (OSA) management platform to deliver the truly service-oriented mobility architecture rather than the wireless standard-specific architecture across OWA SOMI (Service-Oriented Mobility Infrastructure).

10. The OWA MAC terminal as recited in claim 9 wherein said OWA SOMI comprises said OWA Mobile Terminals, OWA Access Networks and OWA IP (Internet Protocol) Backbone networks.

11. The OWA MAC terminal as recited in claim 1 wherein said packet flow scheduler enables the best efficient packet flow, including IP flow, across various common air interfaces and said multi-dimensional handovers of said OWA mobile terminal to maximize the spectrum utilization efficiency in the wireless end-to-end IP connectivity infrastructure.

12. The OWA MAC terminal as recited in claim 1 wherein said resource allocation manager manages both system resources including system power, baseband processing capacity, radio transceiver capacity, networking capacity and service/application processing capacity, and transmission resources including available spectrum, air interfaces, communication bandwidth and radio transmission performance.

13. The OWA MAC terminal as recited in claim 1 wherein said channel access and scheduler module manages the wireless transmission resource schedule and access control of various air interfaces including frequency channel access, time slot channel access, code channel access, packet channel access and frame channel access.

14. The OWA MAC terminal as recited in claim 1 wherein said spectrum manager module displays and updates digital spectrum map in the service geographic area and generates optimal spectrum utilization model for future open spectrum management platform by calculating updated spectrum parameters and data.

15. The OWA MAC terminal as recited in claim 1 wherein said Security Module defends said OWA mobile terminal against viruses, spyware, worms, phishing scams, spam, identity theft, spectrum misuse and inappropriate mobile contents, and protects said OWA mobile terminal from unauthorized resource consumption.

16. The OWA MAC terminal as recited in claim 1 wherein said security module provides enhanced security layer to the service contents across the various air interfaces, constructs the security firewall for the sensitive IP packets across the multi-layered service offerings, and performs the OWA security check for each open software module defined in said OWA mobile terminal.

* * * * *